June 3, 1930.  B. S. HARRIS ET AL  1,761,264
REAPER THRASHER
Filed Aug. 12, 1927
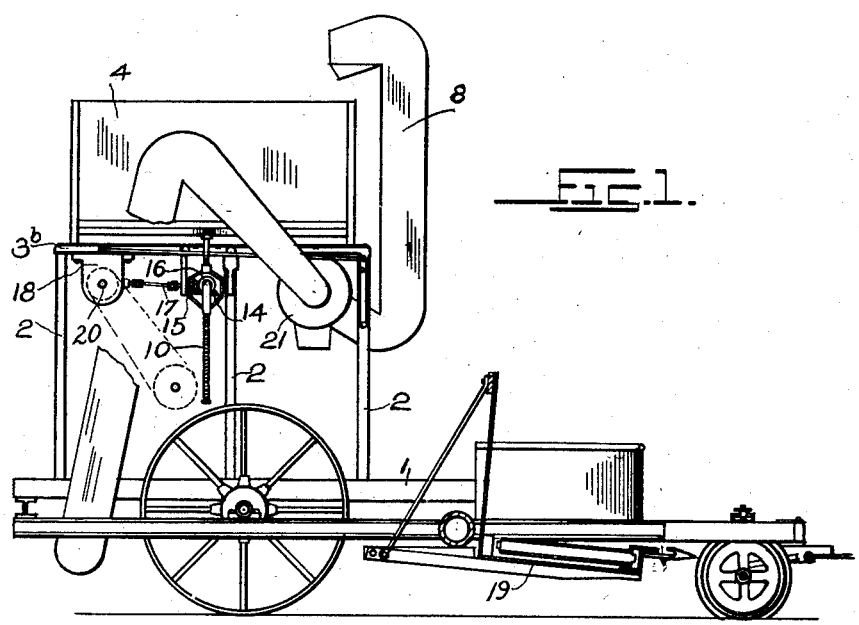
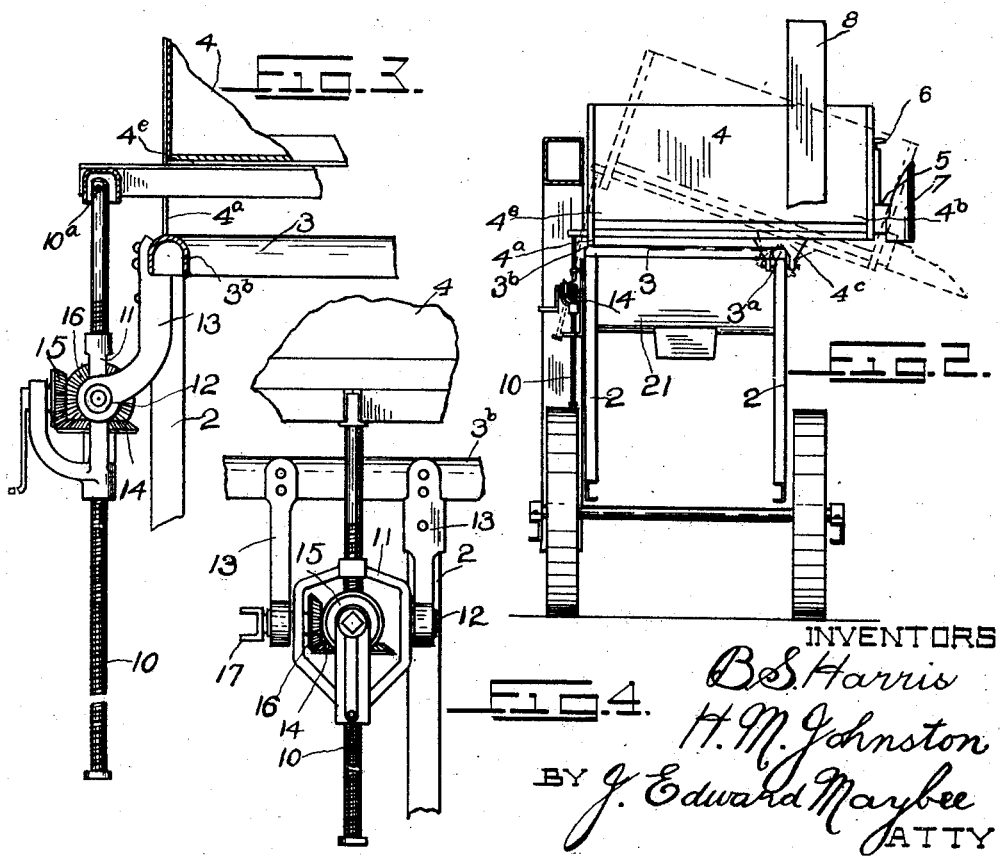
INVENTORS
B. S. Harris
H. M. Johnston
BY J. Edward Maybee
ATTY Patented June 3, 1930

1,761,264

UNITED STATES PATENT OFFICE

BURTON S. HARRIS AND HOWARD M. JOHNSTON, OF TORONTO, ONTARIO, CANADA, ASSIGNORS TO MASSEY-HARRIS COMPANY, LIMITED, OF TORONTO, CANADA

REAPER THRASHER

Application filed August 12, 1927. Serial No. 212,590.

This invention relates to implements adapted to cut grain and thrash it in the field, which employ cutting means, thrashing means, and means for conveying the thrashed grain to a grain tank from which it is discharged by gravity to a vehicle for transporting it to a granary. Our object is to so carry the grain tank that its center of gravity will be kept normally as close as possible to the ground.

We attain our object by the constructions briefly described as follows. To the upper ends of standards secured to the main frame of the machine are secured tie-members on one of which is pivotally mounted the grain tank. The latter is provided at one end with a hinged spout and an outlet which is normally closed by a slide door. The end of the tank remote from the spout normally rests on the member opposite to the one which serves as a fulcrum for the tank. Thrashed grain is carried by a conveyor to the tank and is discharged by the action of gravity from the spout which is located at one side of the machine so that a vehicle may be drawn alongside the machine under the tank spout. To facilitate the emptying of the tank the end thereof that is remote from the spout is raised to tilt the tank. This is accomplished by rotating a nut carried by the frame and threaded on a screw carried by the tank. The nut is formed as a gear which is rotated in one direction of rotation to raise and in the opposite direction to lower the screw. The constructions are hereinafter more fully described and illustrated in the accompanying drawings in which.

Fig. 1 is a side elevation of part of a reaper-thrasher;

Fig. 2 a front elevation thereof showing the normal position of the grain tank in full lines and the tilted position thereof in dotted lines;

Fig. 3 a detail in cross section of the tank; and

Fig. 4 a front elevation of the parts shown in Fig. 3.

In the drawings like numerals of reference indicate corresponding parts in the different figures.

1 is a part of a reaper-thrasher main frame on which are carried various parts that are not shown nor described as they form no part of the present invention. Standards 2 having their lower ends secured to the frame 1 have their upper ends connected by inverted U shaped tie-beams or members 3 which are arranged to define a rectangular framework. On one of these members is pivotally mounted a grain tank 4 one end of which is provided with one or more grain outlets 5. Each outlet is normally closed by a slide door 6, which may be operated in any suitable manner and which is provided with a hinged spout 7. The spout or spouts 7 are located at the side of the machine opposite to the side on which the header platform 19 is carried. The end $4^e$ of the tank remote from the outlets 5 is provided with shoes $4^a$ which normally rest on the member $3^b$ which is opposite to the one on which the tank is pivoted.

Intermediate the ends of the side members $4^b$ of the tank are provided depending saddles $4^c$ which are cut to form inverted V shaped notches the sides of which rest on the longitudinal tie member $3^a$ so that the tank may be rocked in a vertical plane.

To raise and lower the end $4^e$ of the tank out of and into engagement with the longitudinal member $3^b$ we provide the following means. A screw 10 pivotally connected at $10^a$ with the bottom of the tank adjacent the end $4^e$ thereof is slidably mounted in a yoke 11 which is pivoted at 12 on the brackets 13. These brackets are secured to the member $3^b$. On the screw is threaded a nut, which is formed as a bevel gear 14, the lower end of which engages a part of the yoke 11. From this description it is obvious that by rotating the bevel gear nut 14 in one direction the screw 10 will be axially moved to raise the end $4^e$ of the tank and that the pivotal connections $10^a$ and 12 will permit the screw and yoke to swing as a unit as the tank is being raised or lowered whereby there is no binding action between these parts nor between the screw and the nut 14. With the bevel gear nut 14 is meshed a crank operated bevel gear 15 and a power driven bevel gear 16 which is connected by a shaft 17 with a gear box 18. This shaft has one end journalled concentric to the pivot 12 of the yoke 11. The gear box 18 is of ordinary construction and is provided with a drive shaft 20 which may be actuated in any convenient manner from an internal combustion engine (not shown) which is used to drive the cutting, conveying and thrashing means of the apparatus.

The mode of operation is as follows. The grain is thrashed in the usual manner and is then passed through the usual rotary screen 21 which is carried on the underside of the members 3. The screened grain is carried by a conveyor 8 to the grain tank 4 and when the latter is nearly filled a wagon is drawn up beside the machine and under the spouts 7. The latter are then lowered, by any suitable means, relative to the outlet end of the tank and the slide doors 6 are opened. The operator then either operates the crank bevel gear 15 or throws in the clutch lever 21 of the gear box to rotate the gear-nut 14 whereby the grain tank will be tilted to discharge its contents into the wagon. The conveyor 8 is so arranged relative to the tank that any grain thrashed during the discharging operation will be conveyed to the tank. With this arrangement the center of gravity of the grain tank and thus the center of gravity of the whole machine will be kept normally as close as possible to the ground, and as the tank is pivoted intermediate its ends the spouts 7 will be swung into the wagon box when the tank is tilted.

What we claim is:

1. In a reaper-thrasher the combination of a frame; a grain tank pivotally mounted on the frame; a screw having one end in engagement with the tank; a yoke carried on the frame; and a nut threaded on the screw and engaging the yoke whereby the tank will be tilted when the nut is rotated in one direction.

2. In a reaper-thrasher the combination of a frame; a grain tank pivotally mounted on the frame; a screw having one end in engagement with the tank; a yoke carried on the frame; a nut threaded on the screw and engaging the yoke; and means for rotating the nut to raise one end of the tank.

3. In a reaper-thrasher the combination of a frame including two members; a grain tank pivotally mounted on one of the said members and normally adapted to rest on the other member; a yoke pivotally mounted on the frame; a screw pivotally connected with the tank and slidably mounted in the yoke; a gear threaded on the screw and engaging the yoke; and means for rotating the gear to move the screw axially to rock the tank out of and into engagement with the last mentioned frame member.

4. In a reaper-thrasher the combination of a frame including two members; a grain tank pivotally mounted on one of the said members and normally adapted to rest on the other member; a yoke pivotally mounted on the frame; a screw pivotally connected with the tank and slidably mounted in the yoke; a gear threaded on the screw and engaging the yoke; and means including a power driven pinion and a manually operable pinion for rotating the gear to move the screw axially to rock the tank out of and into engagement with the last mentioned frame member.

5. In a reaper-thrasher the combination of a frame including two members; a grain tank pivotally mounted on one of the said members and normally adapted to rest on the other member; brackets carried by the last mentioned member; a yoke trunnioned on the brackets, one of the trunnions being hollow; a screw pivotally connected with the tank and slidably mounted in the yoke; a gear threaded on the screw and engaging the yoke; a shaft extending through the hollow trunnion; a pinion secured to the shaft and meshed with the gear; a second shaft carried by the yoke; and a pinion secured to the last mentioned shaft and meshed with the gear.

Signed at Hereford, Colo., this 13th day of July, 1927.

BURTON S. HARRIS.
HOWARD M. JOHNSTON.